L. HULL.
Metallic-Bedstead Fastening.
No. 200,198.　　　　Patented Feb. 12, 1878.
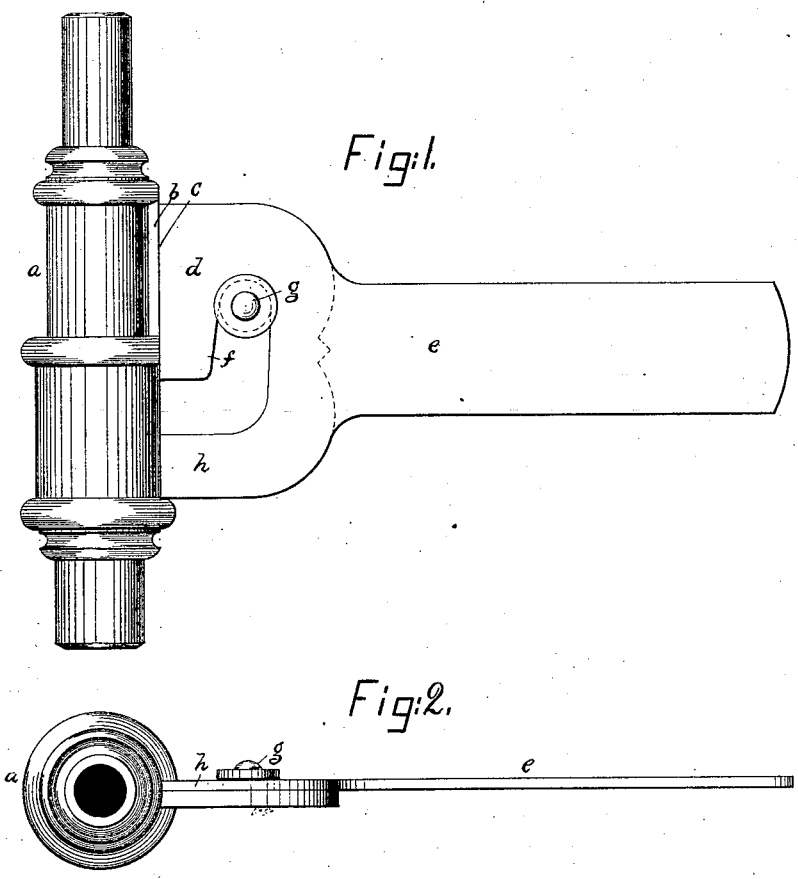

UNITED STATES PATENT OFFICE.

LIVERUS HULL, OF CHARLESTOWN, MASSACHUSETTS.

IMPROVEMENT IN METALLIC-BEDSTEAD FASTENINGS.

Specification forming part of Letters Patent No. 200,198, dated February 12, 1878; application filed October 18, 1877.

*To all whom it may concern:*

Be it known that I, LIVERUS HULL, of Charlestown, in the county of Suffolk and State of Massachusetts, have invented an Improvement in Metallic Bedsteads, of which the following is a specification:

This invention relates to metallic bedsteads, and has for its object to connect the side rails and post and head portions in a cheap, efficient, and rigid manner.

The invention consists in providing the end of the side rail, or a continuation thereof, with a wedge-shaped hook, adapted to engage a stud placed outside the post, or other part of the head or foot portion of the bed, and also to bear against a ledge or projection at the outside of the corner-post, the wedge-shaped hook thus having a bearing at each of its edges, whereby the side pieces and foot and head portions, when connected together, are held very firmly and rigidly, and the joint is rendered very tight and secure.

Figure 1 represents a corner-post of a head or foot portion, with a piece of a side rail connected with it in accordance with my invention, the posts being viewed from the inner side of the side rail; and Fig. 2 is an underside view of Fig. 1.

The corner-post $a$ may be of any suitable design. It is provided at its outer side with a bearing-ledge, $b$, for the edge $c$ of the wedge-shaped hook $d$, forming preferably an integral part of the metallic side rail $e$.

This hook, formed by cutting out the side rail, as shown in Fig. 1, or by casting, has an inclined or beveled edge, $f$, which, as the hook is entered or inserted between the headed pin or stud $g$ and the bearing-ledge, comes to rest against the pin. This hook, resting with one edge on the pin outside the post, and with its other edge against the bearing-ledge $b$, so holds the side piece and post together that they cannot tip or turn with relation to each other by reason of weight applied to the bed-bottom when the bed is in use.

The projection $h$, taking a bearing on a portion of the post below the stud $g$, relieves the hook from strain, to which it would otherwise be subjected.

I am aware that a metal plate provided with a wedge-shaped hook to engage a pin in a slot cut in a bed-post has been used to confine a side rail to a head or foot post of a wooden bedstead; but in such case the inclined inner edge of the hook, engaging the pin extended across a slot cut into a post, has drawn the end of the wooden side rail against the face of the post. I am not aware that such a hook has ever been so combined with a corner-post as to have a bearing thereon opposite the portion of the hook which rests upon the headed pin placed outside of and beyond the post engaged by the hook.

In a bedstead wherein the hook at its outer edge does not take a bearing upon the ledge of the post, as herein described, it is necessary to make the ends of the side rails perfectly at right angles to a line drawn through their centers from end to end, as the ends of such side rails fit the posts, and determine whether or not the head and foot portions are to occupy vertical positions. The head of the pin $g$ prevents lateral motion of the hook and retains it on the pin.

I do not broadly claim a hook on the side rail to fit over a pin passed through a slot in the post; nor do I broadly claim a hooked plate, or a hook to engage a pin placed in a slot in a post, as I am aware such devices are old; but, Having described my invention, I claim—

1. In a metallic bedstead, the combination, with the corner-post, its bearing-ledge $b$, and the pin $g$, located outside of the post, of the side piece provided with the hook $d$, shaped and adapted to bear at its edges against both the pin and bearing-ledge, to operate substantially as and for the purpose set forth.

2. The metallic post, its projection $h$, the bearing-ledge $b$ outside of it, and the headed pin $g$ secured to the projection $h$, in combination with the hooked portion $d$, shaped to co-operate with the ledge and pin, all substantially as described.

In testimony whereof I have signed my name to this specification in the presence of two subscribing witnesses.

LIVERUS HULL.

Witnesses:
G. W. GREGORY,
S. B. KIDDER.